United States Patent
Song et al.

(10) Patent No.: US 11,680,863 B2
(45) Date of Patent: Jun. 20, 2023

(54) METHOD FOR REDUCING THE HYSTERESIS ERROR AND THE HIGH FREQUENCY NOISE ERROR OF CAPACITIVE TACTILE SENSORS

(71) Applicant: SOUTHEAST UNIVERSITY, Nanjing (CN)

(72) Inventors: Aiguo Song, Nanjing (CN); Shuyan Yang, Nanjing (CN); Baoguo Xu, Nanjing (CN); Huijun Li, Nanjing (CN); Hong Zeng, Nanjing (CN); Lifeng Zhu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 264 days.

(21) Appl. No.: 17/288,534

(22) PCT Filed: Jul. 1, 2020

(86) PCT No.: PCT/CN2020/099648
§ 371 (c)(1),
(2) Date: Apr. 25, 2021

(87) PCT Pub. No.: WO2021/253505
PCT Pub. Date: Dec. 23, 2021

(65) Prior Publication Data
US 2022/0107237 A1    Apr. 7, 2022

(30) Foreign Application Priority Data

Jun. 19, 2020  (CN) .......................... 202010564182.0

(51) Int. Cl.
*G01L 25/00*    (2006.01)
*G01L 1/14*    (2006.01)
(Continued)

(52) U.S. Cl.
CPC .............. *G01L 25/00* (2013.01); *G01L 1/142* (2013.01); *G01L 9/12* (2013.01); *G06F 3/044* (2013.01); *G06F 3/0418* (2013.01)

(58) Field of Classification Search
CPC . G01L 25/00; G01L 1/142; G01L 9/12; G06F 3/0418; G06F 3/044
See application file for complete search history.

(56) References Cited

U.S. PATENT DOCUMENTS

2009/0205437 A1 * 8/2009 Dallenbach ............. G01L 1/142
73/780
2010/0257948 A1 * 10/2010 Eilersen .................. G01L 1/142
73/862.626
(Continued)

FOREIGN PATENT DOCUMENTS

CN        101776502 A    7/2010
CN        103575331 A    2/2014
(Continued)

*Primary Examiner* — Feba Pothen
*Assistant Examiner* — Joseph O Nyamogo
(74) *Attorney, Agent, or Firm* — Bayramoglu Law Offices LLC

(57) ABSTRACT

A method for reducing hysteresis error and high frequency noise error of capacitive tactile sensors includes the following steps: step 1: calibration, specifically including positive stroke calibration to form n positive stroke curves and negative stroke calibration to form n negative stroke curves; step 2: averaging, specifically including positive stroke averaging to form an average positive stroke curve, negative stroke averaging to form an average negative stroke curve, and comprehensive averaging to form a comprehensive stroke curve; step 3: fitting modeling, to obtain a positive stroke fitting function, a negative stroke fitting function, and a comprehensive fitting function; step 4: measurement; step 5: noise filtering; step 6: stroke direction discrimination; and step 7: resolving, to obtain the force at the current time by (Continued)

Calibration and modeling phase

Measurement phase using a corresponding fitting function based on the stroke direction discrimination result.

5 Claims, 2 Drawing Sheets

(51) Int. Cl.
    *G06F 3/041*     (2006.01)
    *G06F 3/044*     (2006.01)
    *G01L 9/12*     (2006.01)

(56) References Cited

U.S. PATENT DOCUMENTS

2016/0131550 A1    5/2016    Besling et al.
2017/0292888 A1*   10/2017    Chen ................... G01L 25/00

FOREIGN PATENT DOCUMENTS

| CN | 106525332 A | 3/2017 |
| --- | --- | --- |
| CN | 110174213 A | 8/2019 |
| CN | 110553786 A | 12/2019 |
| CN | 110865728 A | 3/2020 |
| CN | 110908542 A | 3/2020 |

\* cited by examiner

METHOD FOR REDUCING THE HYSTERESIS ERROR AND THE HIGH FREQUENCY NOISE ERROR OF CAPACITIVE TACTILE SENSORS

CROSS REFERENCE TO THE RELATED APPLICATIONS

This application is the national phase entry of International Application No. PCT/CN2020/099648, filed on Jul. 1, 2020 which is based upon and claims priority to Chinese Patent Application No. 202010564182.0, filed on Jun. 19, 2020, the entire contents of which are incorporated herein by reference.

TECHNICAL FIELD

The present invention relates to the field of sensors, and in particular, to a method for reducing the hysteresis error and the high frequency noise error of capacitive tactile sensors.

BACKGROUND

A tactile sensor is a device or an apparatus that converts a tactile signal into an electrical signal, and has important application value in fields such as robots, wearable electronic devices, and medical detection.

In principle, common tactile sensors are mainly classified into piezoresistive tactile sensors, capacitive tactile sensors, inductive tactile sensors, piezoelectric tactile sensors, photoelectric tactile sensors, and the like. Capacitive tactile sensors have been widely studied and applied because of advantages such as a simple structure, easy lightweight and miniaturization, and not affected by temperature.

However, due to factors such as the plastic deformation of elastic material serving as the capacitor dielectric layer, a hysteresis error becomes the main factor affecting the accuracy of capacitive tactile sensors, and causes a measurement error value ranging from 10% F.S. to 20% F.S.

In addition, the output lead of the sensor and the parasitic capacitor in the detection circuit cause serious high frequency noise, further increasing the measurement error.

Therefore, reducing the hysteresis error and the high frequency noise error is the key to improve the accuracy of capacitive tactile sensors. In existing methods, a hardware circuit is generally used to filter the high frequency noise. Then, the least square method is used to perform linear fitting on the measured data to obtain a fitting line as the input-output relationship of the capacitive tactile sensor. And there is no existing method which has reduced the hysteresis error effectively.

SUMMARY

The technical problem to be resolved by the present invention is to provide a method for reducing the hysteresis error and the high frequency noise error of capacitive tactile sensors in view of the shortcomings of the prior art. In the method for reducing the hysteresis error and the high frequency noise error of capacitive tactile sensors, calibration and resolving are performed on loading and unloading processes separately, to effectively reduce the impact of the hysteresis error while eliminating the high frequency noise error, thereby improving the measurement accuracy of the capacitive tactile sensor.

To resolve the foregoing technical problem, a technical solution used in the present invention is as follows:

A method for reducing the hysteresis error and the high frequency noise error of capacitive tactile sensors, comprising the following steps:

step 1: calibration, specifically comprising the following steps:

step 1-1: positive stroke calibration: successively applying m standard loads to the capacitive tactile sensor, wherein the m standard loads gradually increase at a specified step size; forming a loading measurement point each time a standard load is applied; recording a corresponding standard load value and capacitance value at each loading measurement point; and after loading is completed, fitting the standard load values and the capacitance values of the m loading measurement points to form a positive stroke curve;

step 1-2: negative stroke calibration: successively applying m standard loads to the capacitive tactile sensor, wherein the m standard loads gradually decrease at a specified step size; forming an unloading measurement point each time a standard load is applied; recording a corresponding standard load value and capacitance value at each unloading measurement point; and after unloading is completed, fitting the standard load values and the displayed capacitance values of the m unloading measurement points to form a negative stroke curve; and step 1-3: repeating step 1-1 and step 1-2 n times, wherein n≥3, and n positive stroke curves and n negative stroke curves are formed;

step 2: averaging, comprising the following steps:

step 2-1: positive stroke averaging: calculating the arithmetic average value of n capacitance values corresponding to the n positive stroke curves formed in step 1 at each loading measurement point, and recording the arithmetic average value of each capacitance as a positive stroke average capacitance; obtaining m positive stroke average capacitances at the m loading measurement points; and forming an average positive stroke curve according to the standard load values of the m loading measurement points and the m positive stroke average capacitances;

step 2-2: negative stroke averaging: calculating the arithmetic average value of n capacitance values corresponding to the n negative stroke curves formed in step 1 at each unloading measurement point, and recording the arithmetic average value of each capacitance as a negative stroke average capacitance; obtaining m negative stroke average capacitances at the m unloading measurement points; and forming an average negative stroke curve according to the standard load values of the m unloading measurement points and the m negative stroke average capacitances;

step 2-3: comprehensive averaging: calculating the arithmetic average value of the n positive stroke capacitance values and the n negative stroke capacitance values at a certain standard loading measurement point, and recording this arithmetic average value as a comprehensive stroke average capacitance; obtaining m comprehensive stroke average capacitances at m standard loading measurement points; and forming a comprehensive stroke curve according to the m standard loads and the m comprehensive stroke average capacitances;

step 3: fitting modeling: separately performing least square fitting on the average positive stroke curve, the average negative stroke curve, and the comprehensive stroke curve formed in step 2, to obtain a positive stroke fitting function, a negative stroke fitting function, and a comprehensive fitting function;

step 4: measurement: using the capacitive tactile sensor calibrated in step 1 to perform actual measurement, to obtain several measurement capacitance data;

step 5: noise filtering: performing weighted average filtering on the measurement data obtained in step 4, to obtain a filtered capacitance value;

step 6: stroke direction discrimination: If it is continuous measurement mode in step 4, comparing the filtered capacitance value at the current time with the filtered capacitance value at the previous time, to determine whether the current measurement mode is a loading stroke or an unloading stroke; or if it is single measurement mode in step 4, directly performing step 7; and step 7: resolving: if the discrimination result in step 6 is a loading stroke, substituting the filtered capacitance value at the current time into the positive stroke fitting function in step 3 to obtain the force at the current time; if the discrimination result is an unloading stroke, substituting the filtered capacitance value at the current time into the negative stroke fitting function in step 3 to obtain the force at the current time; or if the discrimination result is single measurement mode, substituting the filtered capacitance value at the current time into the comprehensive fitting function in step 3 to obtain the force at the current time.

In step 5, it is assumed that the filtered capacitance value at the current time t is $\bar{y}_t$, and in this case, a calculation formula of $\bar{y}_t$ is as follows:

$$\bar{y}_t = \frac{ay_t + b\bar{y}_{t-1} + c\bar{y}_{t-2}}{a+b+c}$$

$y_t$ is a measured capacitance value at the time t; $\bar{y}_{t-1}$ is a filtered capacitance value at the time t−1; $\bar{y}_{t-2}$ is a filtered capacitance value at the time t−2; a, b, and c are weighted coefficients, and a>b>c.

In step 5, a=3, b=2, and c=1, and in this case, the calculation formula of $\bar{y}_t$ is as follows:

$$\bar{y}_t = \frac{3y_t + 2\bar{y}_{t-1} + \bar{y}_{t-2}}{6}$$

$\bar{y}_t$ is the filtered capacitance value at the time t.

In step 2, the positive stroke average capacitance, the negative stroke average capacitance, and the comprehensive stroke average capacitance are calculated by using the following formulas:

$$\bar{y}_{ip} = \frac{\sum_{j=1}^{n} y_{ijp}}{n} \quad i=1,2,\ldots,m$$

$$\bar{y}_{in} = \frac{\sum_{j=1}^{n} y_{ijn}}{n} \quad i=1,2,\ldots,m$$

$$\bar{y}_i = \frac{\sum_{j=1}^{n} y_{ijp} + \sum_{j=1}^{n} y_{ijn}}{2n} \quad i=1,2,\ldots,m$$

wherein:

$y_{ijp}$ is a capacitance value of the $i^{th}$ loading measurement point in the $j^{th}$ calibration, wherein j=1,2, . . . , n;

$y_{ijn}$ is a capacitance value of the $i^{th}$ unloading measurement point in the $j^{th}$ calibration, wherein j=1,2, . . . , n;

$\bar{y}_{ip}$ is a positive stroke average capacitance of the $i^{th}$ loading measurement point;

$\bar{y}_{in}$ is a negative stroke average capacitance of the $i^{th}$ unloading measurement point; and $\bar{y}_i$ is a comprehensive stroke average capacitance of the $i^{th}$ standard loading measurement point.

In step 7, it is assumed that the force at the current time t obtained through resolving is $\hat{x}_t$, and in this case, a calculation formula of $\hat{x}_t$ is as follows:

$$\hat{x}_t = \begin{cases} F_p^{-1}(\bar{y}_t) & \text{continuous measurement, and } \bar{y}_t > \bar{y}_{t-1} \\ F_n^{-1}(\bar{y}_t) & \text{continuous measurement, and } \bar{y}_t < \bar{y}_{t-1} \\ \hat{x}_{t-1} & \text{continuous measurement, and } \bar{y}_t = \bar{y}_{t-1} \\ F_{ave}^{-1}(\bar{y}_t) & \text{single measurement} \end{cases}$$

wherein:

$\bar{y}_t$ is the filtered capacitance value at the time t;

$\bar{y}_{t-1}$ is a filtered capacitance value at the time t−1;

$F_p^{-1}$ is an inverse function of the positive stroke fitting function $F_p$;

$F_n^{-1}$ is an inverse function of the negative stroke fitting function $F_n$;

$F_{ave}^{-1}$ is an inverse function of the comprehensive fitting function $F_{ave}$;

$\hat{x}_{t-1}$ is an acting force at the time t−1 obtained through resolving; and $\hat{x}_t$ is the acting force at the time t obtained through resolving.

The present invention has the following beneficial effects.

(1) In the present invention, high frequency noise error caused by a parasitic capacitor is considered. Both calibration data and measurement data are filtered to reduce the high frequency noise error, thereby further improving the measurement accuracy of the capacitive tactile sensor.

(2) In the present invention, calibration, modeling, and resolving are performed on loading and unloading processes separately, to effectively reduce the impact of the hysteresis error while eliminating the high frequency noise error, thereby improving the measurement accuracy of the capacitive tactile sensor.

(3) In the present invention, the stroke direction is determined by comparing the measurement data at the current time with the measurement data at the previous time. And the current data is substituted into different fitting functions for resolving according to the judgement results, thereby ensuring the reliability of the measurement result.

DETAILED DESCRIPTION OF THE EMBODIMENTS

The following further describes the present invention in detail with reference to the accompanying drawings and preferred embodiments.

In the description of the present invention, it should be understood that orientation or position relationships indicated by the terms such as "left side", "right side", "upper portion", and "lower portion" are based on orientation or position relationships shown in the accompanying drawings, and are used only for ease and brevity of illustration and description of the present invention, rather than indicating or implying that the mentioned apparatus or component needs to have a particular orientation or needs to be constructed and operated in a particular orientation, and "first", "second", or the like does not indicate the importance of the component. Therefore, such terms should not be construed as limiting of the present invention. A specific size used in an embodiment is merely used for describing an example of the technical solution and does not limit the protection scope of the present invention.

Figure 1:
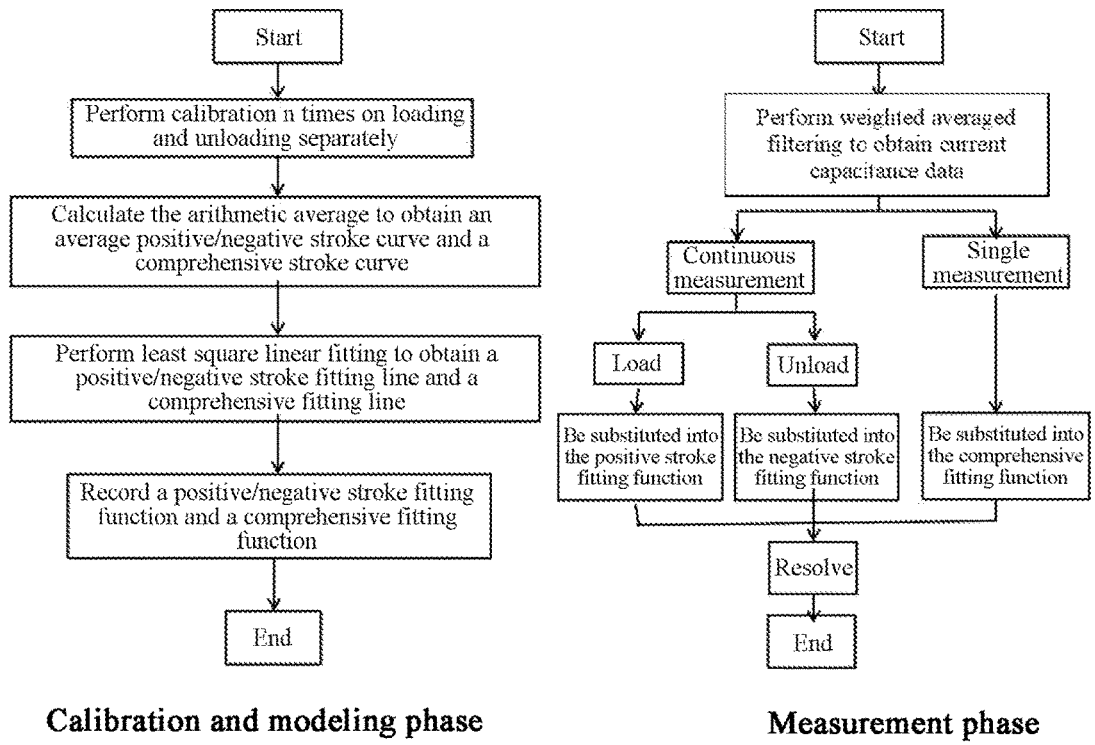
FIG. 1 is a flowchart of the present invention.

As shown in FIG. 1, the method for reducing the hysteresis error and the high frequency noise error of capacitive tactile sensors includes a calibration and modeling phase and a measurement phase.

The following steps 1 to 3 constitute the calibration and modeling phase shown in FIG. 1.

Figure 2:
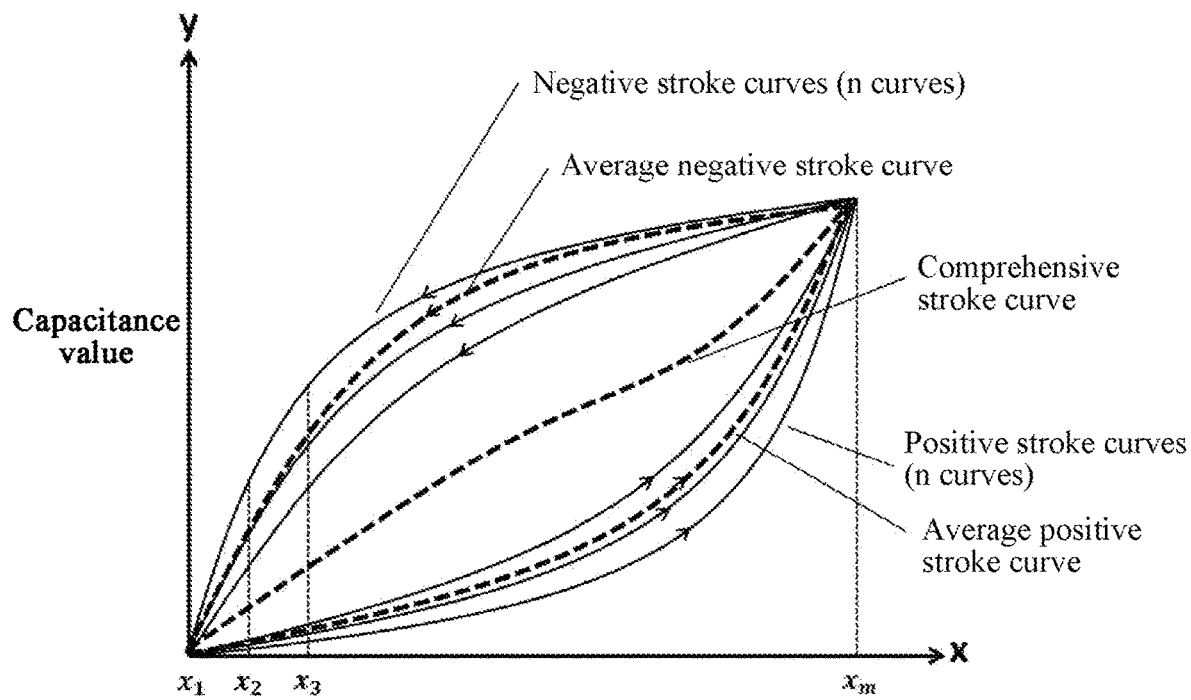
FIG. 2 is a schematic diagram of a calibration curve according to the present invention.

Step 1: Perform calibration, specifically including the following steps:

step 1-1: Positive stroke calibration: successively apply m standard loads to the capacitive tactile sensor, where the m standard loads gradually increase at a specified step size. As shown in FIG. 2, the m standard loads are respectively $x_1, x_2, \ldots, x_m$, and $x_1 < x_2 < \ldots < x_m$.

A loading measurement point is formed each time a standard load is applied. There are m loading measurement points after the m standard loads are applied.

A corresponding standard load value and capacitance value are recorded at each loading measurement point. After loading is completed, the standard load values and the capacitance values of the m loading measurement points are fitted to form a positive stroke curve.

step 1-2: Negative stroke calibration: successively apply m standard loads to the capacitive tactile sensor, where the m standard loads gradually decrease at a specified step size. An unloading measurement point is formed each time a standard load is applied. A corresponding standard load value and capacitance value are recorded at each unloading measurement point. After unloading is completed, the standard load values and the capacitance values of the m unloading measurement points are fitted to form a negative stroke curve.

step 1-3: Repeat step 1-1 and step 1-2 n times, where n≥3, and n positive stroke curves and n negative stroke curves are formed.

Step 2: Perform averaging, including the following steps:

step 2-1: Perform positive stroke averaging.

The arithmetic average value of n capacitance values corresponding to the n positive stroke curves formed in step 1 is calculated at each loading measurement point, and the arithmetic average value of each capacitance is recorded as a positive stroke average capacitance.

It is assumed that a positive stroke average capacitance of the $i^{th}$ loading measurement point is $\bar{y}_{ip}$. In this case, a specific calculation formula is as follows:

$$\bar{y}_{ip} = \frac{\sum_{j=1}^{n} y_{ijp}}{n} \quad i = 1, 2, \ldots, m$$

$y_{ijp}$ is a capacitance value of the $i^{th}$ loading measurement point in the $j^{th}$ calibration, where $j=1,2,\ldots,n$.

The foregoing formula is used to perform averaging on the m loading measurement points separately, to obtain m positive stroke average capacitances.

An average positive stroke curve is formed according to the standard load values of the m loading measurement points and the m positive stroke average capacitances. The average positive stroke curve herein is only a dotted curve of the m positive stroke average capacitances in FIG. 2, and its function is unknown.

step 2-2: Perform negative stroke averaging.

The arithmetic average value of n capacitance values corresponding to the n negative stroke curves formed in step 1 is calculated at each unloading measurement point, and the arithmetic average value of each capacitance is recorded as a negative stroke average capacitance.

It is assumed that a negative stroke average capacitance of the $i^{th}$ unloading measurement point is $\bar{y}_{in}$. In this case, a specific calculation formula is as follows:

$$\bar{y}_{in} = \frac{\sum_{j=1}^{n} y_{ijn}}{n} \quad i = 1, 2, \ldots, m$$

$y_{ijn}$ is a capacitance value of the $i^{th}$ unloading measurement point in the $j^{th}$ calibration, where $j=1,2,\ldots,n$.

The foregoing formula is used to perform averaging on the m unloading measurement points separately, to obtain m negative stroke average capacitances.

An average negative stroke curve is formed according to the standard load values of the m unloading measurement points and the m negative stroke average capacitances. The average negative stroke curve herein is only a dotted curve of the m negative stroke average capacitances in FIG. 2, and its function is unknown.

step 2-3: Perform comprehensive averaging.

The arithmetic average value of the n positive stroke capacitance values and the n negative stroke capacitance values is calculated at a certain standard loading measurement point, and this arithmetic average value is recorded as a comprehensive stroke average capacitance.

It is assumed that a comprehensive stroke average capacitance of the $i^{th}$ standard loading measurement point is $\bar{y}_i$. In this case, a specific calculation formula is as follows:

$$\bar{y}_i = \frac{\sum_{j=1}^{n} y_{ijp} + \sum_{j=1}^{n} y_{ijn}}{2n} \quad i = 1, 2, \ldots, m$$

The foregoing formula is used to perform averaging on the m standard loading measurement points, to obtain m comprehensive stroke average capacitances.

A comprehensive stroke curve is formed according to the m standard loads and the m comprehensive stroke average capacitances. The comprehensive stroke curve is only a dotted curve of the m comprehensive stroke average capacitances in FIG. 2, and its function is unknown.

Step 3: Perform fitting modeling.

Figure 3:
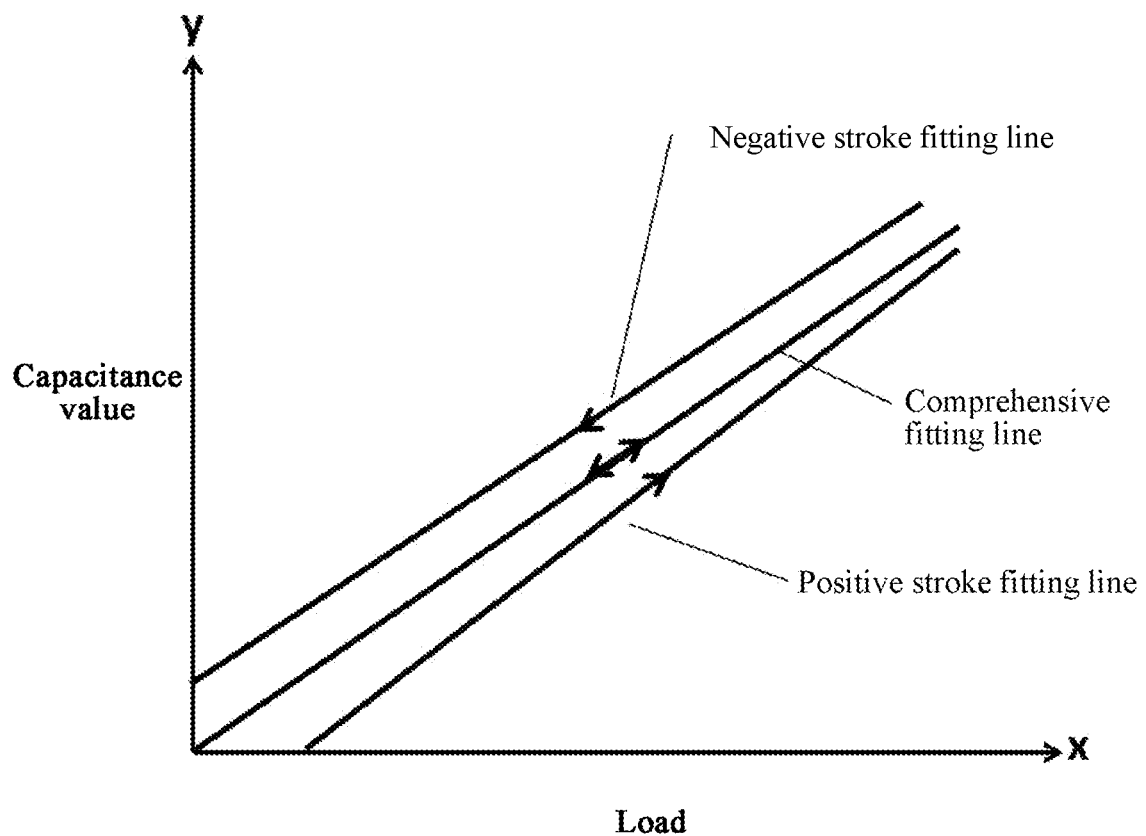
FIG. 3 is a schematic diagram of a fitting line according to the present invention.

Least square fitting is separately performed on the average positive stroke curve, the average negative stroke curve, and the comprehensive stroke curve formed in step 2, to obtain a positive stroke fitting function, a negative stroke fitting function, and a comprehensive fitting function. FIG. 3 shows the positive stroke fitting curve, the negative stroke fitting curve, and the comprehensive fitting curve drawn from the positive stroke fitting function, the negative stroke fitting function, and the comprehensive fitting function. Only the state of linear fitting is shown in FIG. 3, but it can also be multiple term fitting.

The following steps 4 to 7 constitute the measurement phase shown in FIG. 1.

Step 4: Perform measurement.

The capacitive tactile sensor calibrated in step 1 is used to perform actual measurement, to obtain several measurement capacitance data.

Step 5: Perform noise filtering.

Weighted average filtering is performed on the measurment data obtained in step 4, to obtain a filtered capacitance value.

A calculation method of weighted average filtering is specifically as follows:

It is assumed that the filtered capacitance value at the current time t is $\bar{y}_t$. In this case, a calculation formula of $\bar{y}_t$ is as follows:

$$\bar{y}_t = \frac{ay_t + b\bar{y}_{t-1} + c\bar{y}_{t-2}}{a+b+c}$$

$y_t$ is a measured capacitance value at the time t; $\bar{y}_{t-1}$ is a filtered capacitance value at the time t−1; $\bar{y}_{t-2}$ is a filtered capacitance value at the time t−2; a, b, and c are weighted coefficients, and a>b>c.

In this embodiment, the preferred values are a=3, b=2, and c=1. In this case, the calculation formula of $\bar{y}_t$ is as follows:

$$\bar{y}_t = \frac{3y_t + 2\bar{y}_{t-1} + \bar{y}_{t-2}}{6}$$

$\bar{y}_t$ is the filtered capacitance value at the time t.

Step 6: Perform stroke direction discrimination.

If it is continuous measurement mode in step 4, the filtered capacitance value at the current time is compared with the filtered capacitance value at the previous time, to determine whether the current measurement mode is a loading stroke or an unloading stroke.

If it is single measurement mode in step 4, step 7 is directly performed.

Step 7: Perform resolving.

If the discrimination result in step 6 is a loading stroke, the filtered capacitance value at the current time is substituted into the positive stroke fitting function in step 3 to obtain the force at the current time. If the discrimination result in step 6 is an unloading stroke, the filtered capacitance value at the current time is substituted into the negative stroke fitting function in step 3 to obtain the force at the current time. If the discrimination result is single measurement mode, the filtered capacitance value at the current time is substituted into the comprehensive fitting function in step 3 to obtain the force at the current time.

It is assumed that the force at the current time t obtained through resolving is $\hat{x}_t$. In this case, a calculation formula of $\hat{x}_t$ is as follows:

$$\hat{x}_t = \begin{cases} F_p^{-1}(\bar{y}_t) & \text{continuous measurement, and } \bar{y}_t > \bar{y}_{t-1} \\ F_n^{-1}(\bar{y}_t) & \text{continuous measurement, and } \bar{y}_t < \bar{y}_{t-1} \\ \hat{x}_{t-1} & \text{continuous measurement, and } \bar{y}_t = \bar{y}_{t-1} \\ F_{ave}^{-1}(\bar{y}_t) & \text{single measurement} \end{cases}$$

where:

$\bar{y}_t$ is the filtered capacitance value at the time t;

$\bar{y}_{t-1}$ is a filtered capacitance value at the time t−1;

$F_p^{-1}$ is an inverse function of the positive stroke fitting function $F_p$;

$F_n^{-1}$ is an inverse function of the negative stroke fitting function $F_n$;

$F_{ave}^{-1}$ is an inverse function of the comprehensive fitting function $F_{ave}$;

$\hat{x}_{t-1}$ is an acting force at the time t−1 obtained through resolving; and $\hat{x}_t$ is the acting force at the time t obtained through resolving.

The exemplary implementations of the present invention have been described in detail above, but the present invention is not limited to the specific details in the above implementations, and various equivalent variations may be made to the technical solution of the present invention within the scope of the technical idea of the present invention. Such equivalent variations are all within the protection scope of the present invention.

What is claimed is:

1. A method for reducing a hysteresis error and a high frequency noise error of capacitive tactile sensors, comprising the following steps:

step 1: a calibration, specifically comprising the following steps:

step 1-1: a positive stroke calibration: successively applying m standard loads to a capacitive tactile sensor, wherein the m standard loads gradually increase at a specified step size; forming a loading measurement point each time a standard load is applied; recording a first corresponding standard load value and a first capacitance value at each loading measurement point; and after a loading is completed, fitting first standard load values and first capacitance values of m loading measurement points to form a positive stroke curve;

step 1-2: a negative stroke calibration: successively applying the m standard loads to the capacitive tactile sensor, wherein the m standard loads gradually decrease at the specified step size; forming an unloading measurement point each time the standard load is applied; recording a second corresponding standard load value and a second capacitance value at each unloading measurement point; and after an unloading is completed, fitting second standard load values and second capacitance values of the m unloading measurement points to form a negative stroke curve; and step 1-3: repeating step 1-1 and step 1-2 n times, wherein n≥3, and n positive stroke curves and n negative stroke curves are formed;

step 2: an averaging, comprising the following steps:

step 2-1: a positive stroke averaging: calculating a first arithmetic average value of n first capacitance values corresponding to the n positive stroke curves formed in step 1 at the each loading measurement point, and recording the first arithmetic average value of each capacitance as a positive stroke average capacitance; obtaining m positive stroke average capacitances at the m loading measurement points; and forming an average positive stroke curve according to the first standard load values of the m loading measurement points and the m positive stroke average capacitances;

step 2-2: a negative stroke averaging: calculating a second arithmetic average value of n second capacitance values corresponding to the n negative stroke curves formed in step 1 at the each unloading measurement point, and recording the second arithmetic average value of each capacitance as a negative stroke average capacitance; obtaining m negative stroke average capacitances at the m unloading measurement points; and forming an average negative stroke curve according to the second standard load values of the m unloading measurement points and the m negative stroke average capacitances;

step 2-3: a comprehensive averaging: calculating a third arithmetic average value of the n positive stroke capacitance values and the n negative stroke capacitance values at a certain standard loading measurement point, and recording the third arithmetic average value as a comprehensive stroke average capacitance; obtaining m comprehensive stroke average capacitances at m standard loading measurement points; and forming a comprehensive stroke curve according to the m standard loads and the m comprehensive stroke average capacitances;

step 3: a fitting modeling: separately performing a least square fitting on the average positive stroke curve, the average negative stroke curve, and the comprehensive stroke curve formed in step 2, to obtain a positive stroke fitting function $F_p$, a negative stroke fitting function $F_n$, and a comprehensive fitting function $F_{ave}$;

step 4: a measurement: using the capacitive tactile sensor calibrated in step 1 to perform an actual measurement, to obtain several measurement capacitance data;

step 5: a noise filtering: performing a weighted average filtering on the measurement capacitance data obtained in step 4, to obtain a filtered capacitance value;

step 6: a stroke direction discrimination: if it is a continuous measurement mode in step 4, comparing the filtered capacitance value at a current time with the filtered capacitance value at a previous time, to determine whether a current measurement mode is a loading stroke or an unloading stroke; or if it is a single measurement mode in step 4, directly performing step 7; and step 7: a resolving: if a discrimination result in step 6 is the loading stroke, substituting the filtered capacitance value at the current time into the positive stroke fitting function $F_p$ in step 3 to obtain the a force at the current time; if the discrimination result is the unloading stroke, substituting the filtered capacitance value at the current time into the negative stroke fitting function $F_n$, in step 3 to obtain the force at the current time; or if the discrimination result is the single measurement mode, substituting the filtered capacitance value at the current time into the comprehensive fitting function $F_{ave}$; in step 3 to obtain the force at the current time.

2. The method for reducing the hysteresis error and the high frequency noise error of the capacitive tactile sensors according to claim 1, wherein in step 5, it is assumed that the filtered capacitance value at the current time t is $\bar{y}_t$, and in this case, a calculation formula of $\bar{y}_t$ is as follows:

$$\bar{y}_t = \frac{ay_t + b\bar{y}_{t-1} + c\bar{y}_{t-2}}{a+b+c}$$

where $y_t$ is a measured capacitance value at the time t; $\bar{y}_{t-1}$ is the filtered capacitance value at the time t−1; $\bar{y}_{t-2}$ is the filtered capacitance value at the time t−2; a, b, and c are weighted coefficients, and a>b>c.

3. The method for reducing the hysteresis error and the high frequency noise error of the capacitive tactile sensors according to claim 2, wherein in step 5, a=3, b=2, and c=1, and in this case, the calculation formula of $\bar{y}_t$ is as follows:

$$\bar{y}_t = \frac{3y_t + 2\bar{y}_{t-1} + \bar{y}_{t-2}}{6}$$

where $\bar{y}_t$ is the filtered capacitance value at the time t.

4. The method for reducing the hysteresis error and the high frequency noise error of the capacitive tactile sensors according to claim 1, wherein in step 2, the positive stroke average capacitance, the negative stroke average capacitance, and the comprehensive stroke average capacitance are calculated by using the following formulas:

$$\bar{y}_{ip} = \frac{\sum_{j=1}^{n} y_{ijp}}{n} \quad i=1,2,\ldots,m$$

$$\bar{y}_{in} = \frac{\sum_{j=1}^{n} y_{ijn}}{n} \quad i=1,2,\ldots,m$$

$$\bar{y}_i = \frac{\sum_{j=1}^{n} y_{ijp} + \sum_{j=1}^{n} y_{ijn}}{2n} \quad i=1,2,\ldots,m$$

wherein:

$y_{ijp}$ is a capacitance value of an $i^{th}$ loading measurement point in a $j^{th}$ calibration, wherein j=1,2, . . . , n;

$y_{ijn}$ is a capacitance value of the an $i^{th}$ unloading measurement point in the $j^{th}$ calibration, wherein j=1,2, . . . , n;

$\bar{y}_{ip}$ is a positive stroke average capacitance of the $i^{th}$ loading measurement point;

$\bar{y}_{in}$ is a negative stroke average capacitance of the $i^{th}$ unloading measurement point; and $\bar{y}_i$ is a comprehensive stroke average capacitance of an $i^{th}$ standard loading measurement point.

5. The method for reducing the hysteresis error and the high frequency noise error of the capacitive tactile sensors according to claim 1, wherein in step 7, it is assumed that the force at the current time t obtained through the resolving is $\hat{x}_t$, and in this case, a calculation formula of $\hat{x}_t$ is as follows:

$$\hat{x}_t = \begin{cases} F_p^{-1}(\bar{y}_t) & \text{continuous measurement, and } \bar{y}_t > \bar{y}_{t-1} \\ F_n^{-1}(\bar{y}_t) & \text{continuous measurement, and } \bar{y}_t < \bar{y}_{t-1} \\ \hat{x}_{t-1} & \text{continuous measurement, and } \bar{y}_t = \bar{y}_{t-1} \\ F_{ave}^{-1}(\bar{y}_t) & \text{single measurement} \end{cases}$$

wherein:

$\bar{y}_t$ is the filtered capacitance value at the time t;

$\bar{y}_{t-1}$ is the filtered capacitance value at the time t−1;

$F_p^{-1}(\bar{y}_t)$ is a first inverse function of the positive stroke fitting function $F_p$;

$F_n^{-1}(\bar{y}_t)$ is a second inverse function of the negative stroke fitting function $F_n$;

$F_{ave}^{-1}(\overline{y}_t)$ is a third inverse function of the comprehensive fitting function $F_{ave}$;
$\hat{x}_{t-1}$ is an acting force at the time t−1 obtained through the resolving; and
$\hat{x}_t$ is the acting force at the time t obtained through the resolving.

\* \* \* \* \*